United States Patent

[11] 3,583,694

[72] Inventor John R. Davies
2301 Via Burton, Anaheim, Calif. 92806
[21] Appl. No. 28,270
[22] Filed Mar. 20, 1970
[45] Patented June 8, 1971
Continuation of application Ser. No. 723,728, Apr. 24, 1968, now abandoned.

[54] CIRCUIT BOARD CLAMP
3 Claims, 3 Drawing Figs.

[52] U.S. Cl. .......... 269/98, 24/243B, 269/249, 269/43
[51] Int. Cl. .......... B23q 3/02, B25b 5/10
[50] Field of Search .......... 269/37, 40, 43, 249, 97, 98; 24/81 CC, 81 D, 81 N, 81 LP, 81 B, 81, 243.2, 243. CC; 248/229, 41; 29/475, 481—483

[56] References Cited

UNITED STATES PATENTS

| | | | |
|---|---|---|---|
| 769,530 | 9/1904 | Blaker .......... | 269/43X |
| 1,987,826 | 1/1935 | Heumann .......... | 269/98X |
| 2,030,997 | 2/1936 | Madison .......... | 24/81 |
| 2,228,593 | 1/1941 | Dibble .......... | 269/43X |

FOREIGN PATENTS

| | | | |
|---|---|---|---|
| 1,108,013 | 5/1961 | Germany .......... | 269/43 |

*Primary Examiner*—Andrew R. Juhasz
*Assistant Examiner*—Donald D. Evenson
*Attorney*—Robert G. Rogers

ABSTRACT: Two clamp members are stamped from a sheet of stainless steel and welded together at their central area. The members are also provided with threaded openings through one of their halves for mating with a threaded engaging rod.

The central area of each member is depressed relative to the remaining area of the member for forming a channel perpendicular to the longitudinal axis of the member. The base of the depression protrudes from the remaining area of the members so that by aligning the protruding surface a uniform space, or separation, is formed. The members are welded where the protruding surfaces are in contact so that the separation is fixed. The separation is approximately equal to the depth of both depressions.

One half of the clamp thus formed is used to engage the edge of a masked, metal clad dielectric board and the other half is similarly used to engage a support member. The clamp permits current to pass into the board from an electrode. A plurality of boards may be attached to the support member for immersion in an etching solution containing an electrode of opposite polarity to remove the unmasked areas.

INVENTOR.
JOHN R DAVIES
BY Robert G Rogers
ATTORNEY

CIRCUIT BOARD CLAMP

This application is a continuation of application Ser. No. 723,728, filed Apr. 24, 1968, now abandoned.

BACKGROUND OF THE INVENTION

1. Field of the Invention

This invention relates to a clamp and a process for producing the clamp, and, more particularly, to such a clamp produced by stamping suitable clamp members from a metal sheet and rigidly connecting the members in forming the clamp.

2. Description of Prior Art

It is desirable to be able to clamp copper clad dielectric boards to a support member during an etching process. The copper clad boards are suitably masked to expose metal to be removed, and then immersed in an etching solution until the exposed metal is etched away. The remaining metal forms a circuit pattern. Electrodes may be attached to the board and in the solution for aiding the etching process.

Existing clamps have been formed by expensive and time consuming machining processes. In the existing processes, a metal sheet, impervious to the etching solution, is first cut to a desired configuration, usually rectangular, and then machined until a centrally disposed and longitudinally extending spacing has been cut on both sides of the center of the cut member. The spacing are parallel to a plane parallel to the width of the member. A central area, perpendicular to the longitudinal axis of the clamp being formed, is uncut so that it supports the sides of the clamp.

Usually, the clamps are machined from stainless steel because of the resistance o^f^ the metal to the etching solution.

The spacings are wide enough to accommodate the edge of a copper clad dielectric board and the edge of a support means.

A threaded screw may be provided through one side of the clamp on both sides of the central area for securing the board and support edge within the clamp.

The circuit board clamps ordinarily are relatively small. For example, a clamp may be approximately an inch long, one-half inch wide, and includes a spacing of approximately 0.2 inches high.

Since the clamps are small, and therefore the dimensions to be measured are small, the process is made considerably difficult, time consuming, and expensive.

It would more more desirable if a circuit board clamp could be produced without the necessity for machining. Preferably, the clamps should be simply produced and still retain the capabilities for interconnecting a circuit board and a support member during an etching process. The present invention, as described herein, provides a preferred clamp and clamp producing process.

BRIEF SUMMARY OF THE INVENTION

Briefly, the invention comprises a clamp having first and second members, each including depressed central channels extending traversely across the members. The members are joined so that the protruding surfaces of the depressed areas are in contact for forming a separation between the inner surfaces of the members on both sides of said channel. The separation is uniform and parallel to the longitudinal width of the members.

Threaded engaging rods are mated with threaded openings through one-half of each member on opposite sides of said channels for securing the edge of circuit boards and support members during an etching process.

The first and second members are preferably stamped to a desired configuration and size from a sheet of metal impervious to the etching solution being used. The depressed channels are formed simultaneous with the stamping of the members. Subsequently, the members are placed adjacent to each other so that depressions are in contact for forming the desired separation between inner surfaces of the members. The members are then rigidly connected together in the area of said contacting depression by, for example, welding.

Therefore, it is an object of this invention to provide an improved clamp using welded members stamped from metal.

It is still a further object of this invention to provide an improved process for producing a clamp by stamping clamp members from a metal sheet, and then welding the members together in forming the clamp.

It is another object of this invention to provide a circuit board clamp not requiring extensive machining for forming separations between edges.

It is still another object of this invention to provide a process for producing circuit board clamps which does not require extensive machining for producing the separation between edges of the clamp.

A still further object of this invention is to provide a clamp and process for producing the clamp which is relatively improved over a clamp produced by an extensive machining process.

These, and other objects of this invention, will become more apparent from the description of preferred embodiments taken in connection with the drawings, a brief description of which follows.

DESCRIPTION OF PREFERRED EMBODIMENT

Figure 1:
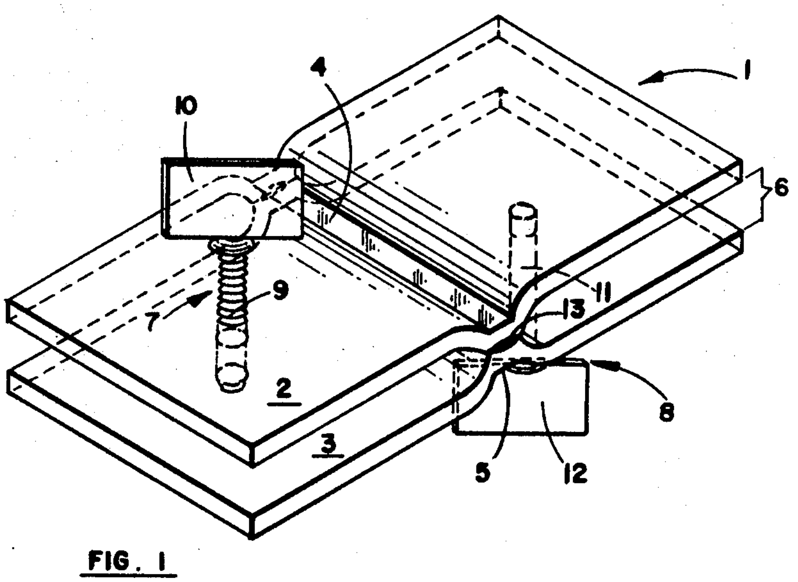
FIG. 1 shows a perspective view of one embodiment of the clamp.

FIG. 1 shows one embodiment of clamp 1 comprising upper member 2 and lower member 3 having depressed channels 4 and 5, respectively, centrally located between the extremities of each member. The channels transverse the longitudinal axes of the members.

The members are disposed adjacent to each other so that the bottom, or protruding, surfaces of the channels are aligned in juxtaposition. As a result, the inner surfaces of the members are separated by uniform spacing. The members are rigidly connected together when the channels are in contact so that the spacing is maintained. The members may be joined, for example, by welding shown as area 13.

Member 2 is provided with engaging member 7 having threaded rod member 9 and gripping handle member 10. The engaging member mates with a threaded opening through member 2 so that it can be rotated to engage or disengage a member inserted into the separation shown.

A flat gripping handle is shown, although other embodiments may also be used. The flat handle may comprise a metal identical to the metal of the other clamp members and may be connected to the threaded rod by welding. The flat handle is the preferred embodiment since it is easier to grip and does not require extensive space.

Similarly, member 3 is provided with engaging member 8 having threaded rod member 11 and gripping handle member 12 for securing a member inserted into the separation 6.

The engaging rod members are provided through opposite sides of the clamp so that an operator will not encounter interference when the clamps are utilized.

Although a rectangular configuration is shown for the member, it should be understood that other configurations are within the scope of the invention.

The dimensions of the clamp may be varied to satisfy the particular requirements of an application.

Since the clamp is ordinarily used in circuit board production processes, and is therefore immersed in etching solutions, it must be comprised of a metal which is impervious to the solution. Stainless steel is one example of a metal which can be used when the invention is immersed in a solution for etching copper from a dielectric material.

In producing the clamp, as contrasted with the prior art processes, the members are stamped by a machine from a metal sheet. The depressions are formed during the stamping. Details on stamp cutting, or stamping, are known to persons skilled in the art, and are therefore omitted from this description. After stamping, the rough edges may require deburring and smoothing, but such details are also known to persons skilled in the art.

Openings are formed through one half of the members on opposite sides of the central area. The openings are tapped to form threads. Metal rods are threaded to mate with the openings and are welded to handles.

The members are placed together so that the depressions form a uniform separation between the members. The members are welded in the area of the contacting depressions. The depressions are made so that the depth of both depressions is at least equal to the desired spacing. The spacing can be larger since the engaging rods can be used to secure boards and support members within the clamp.

Figure 2:
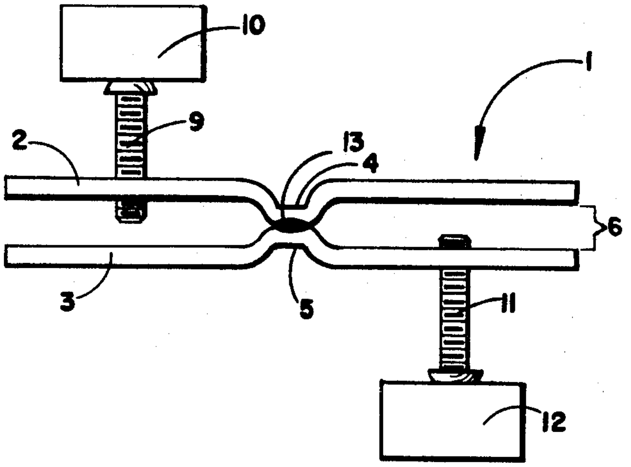
FIG. 2 shows a side view of the FIG. 1 embodiment.

FIG. 2 shows a side view of the FIG. 1 embodiment. Spacing 6 and welded area 13 are more clearly shown, as are engaging members 7 and 8. As previously indicated, the engaging members are located on opposite sides of the clamp so that an operator will not encounter interference when attempting to rotate a handle. The channels are seen to have a U shape resulting from the shape of the metal pressing tool. Other configurations such as a V could also be used.

Figure 3:
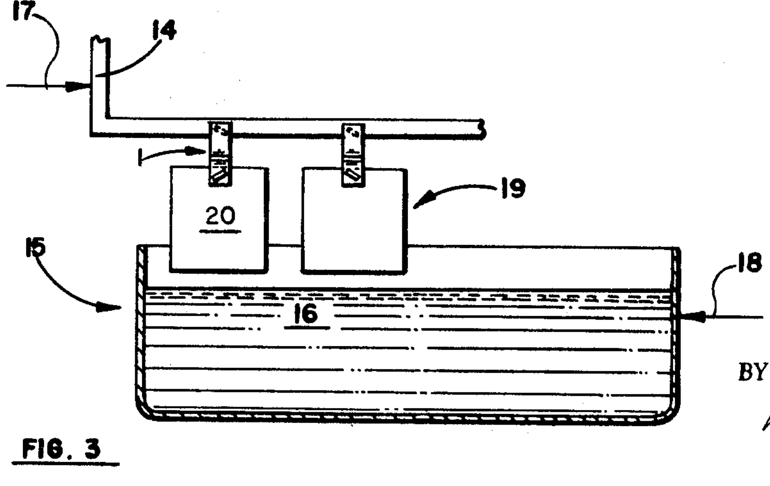
FIG. 3 shows the clamps interconnecting boards, and a support member over an etching solution.

FIG. 3 shows an example of a preferred use for the clamps. The clamps, container, and circuit board members are not drawn to scale. The clamp, for example, is greatly increased in size for purposes of the illustration.

Clamp 1 secures board 20 by its edge to the edge of support 14. Additional clamp and board combination 19 is shown to illustrate that a plurality of boards may simultaneously be involved in the process.

The boards are suspended over etching solution 16 within container 15 by means of the support. The support may be a conductive material so that electrode 17 can be connected directly to the support. The electrode is schematically shown contacting the support. The clamps complete the circuit to the metal of the boards.

Opposite polarity electrode 18 is shown contacting the container which must be comprised of a conducting material to complete the circuit. In the alternative, electrodes could be connected directly in the solution and to the clamps.

The boards may be comprised of copper layers secured to a dielectric laminate such as an epoxy/glass material. The copper surfaces are masked by, for example, a photoresistant material so that only the exposed portions are etched by the solution. The unmasked portions form a circuit pattern to which suitable electronic components can be attached in completing the circuit board. Other details on the circuit board product process are not included since the processes do not form a part of this invention, and since such details are generally known to persons skilled in the art.

Although the invention has been described and illustrated in detail, it is to be understood that the same is by way of illustrating, and that the scope of the invention is limited only by the terms of the appended claims.

I claim:

1. A clamp used in the production of circuit boards for providing electrical current from a source to a clamped board immersed in an etching solution, said clamp comprising, a stainless steel upper member and a stainless steel lower member, said members being disposed in juxtaposition to each other and being welded together at a central location between their longitudinal extremities, said upper and lower members on both sides of said welded connection being spread apart for forming a uniform separation between the members, said uniform separation being compatible with the thickness of a circuit board and compatible with an electrode means for supplying current through said clamp into said circuit board when the circuit board is immersed in an etching solution, means provided in one or both of said members for securing said circuit board in the space between said members.

2. The clamp recited in claim 1 further including a second stainless steel clamp comprising uniform separations on each side of a welded central connection, and means for securing circuit boards in each of said uniform separations, one of said uniform separations being clamped to said first recited circuit board, the second of said uniform separations being clamped to an additional circuit board whereby said clamps interconnect a plurality of circuit boards in series between an electrical source and said etching solution.

3. The clamp recited in claim 1 wherein said upper member and said lower member comprise stamped pieces of stainless steel, said uniform separation between said members comprising adjacent depressions stamped in said upper and lower members.